(12) United States Patent
Steiner

(10) Patent No.: US 8,684,258 B2
(45) Date of Patent: Apr. 1, 2014

(54) PROCESS FOR REDUCING ALUMINIUM PICK-UP, AND ULTRASONIC WELDING DEVICE

(75) Inventor: Ernst Steiner, Heuchelheim (DE)

(73) Assignee: Schunk Sonosystems GmbH, Wettenberg (DE)

( * ) Notice: Subject to any disclaimer, the term of this patent is extended or adjusted under 35 U.S.C. 154(b) by 255 days.

(21) Appl. No.: 12/739,752

(22) PCT Filed: Nov. 7, 2008

(86) PCT No.: PCT/EP2008/065162
§ 371 (c)(1),
(2), (4) Date: Apr. 26, 2010

(87) PCT Pub. No.: WO2009/060080
PCT Pub. Date: May 14, 2009

(65) Prior Publication Data
US 2012/0125976 A1    May 24, 2012

(30) Foreign Application Priority Data
Nov. 9, 2007 (DE) .......................... 10 2007 053 913

(51) Int. Cl.
*B23K 31/00*  (2006.01)
*B23K 20/08*  (2006.01)

(52) U.S. Cl.
USPC ...................... 228/180.5; 228/904; 228/110.1

(58) Field of Classification Search
USPC .................................... 228/110.1–111.5, 1.1
See application file for complete search history.

(56) References Cited

U.S. PATENT DOCUMENTS

| | | | |
|---|---|---|---|
| 3,717,842 A | | 2/1973 | Douglas, Jr. |
| 4,732,364 A | * | 3/1988 | Seger et al. .................. 251/368 |
| 5,027,412 A | * | 6/1991 | Hayashi et al. ............... 381/409 |
| 5,135,061 A | * | 8/1992 | Newton, Jr. ................... 175/428 |
| 5,147,082 A | * | 9/1992 | Krause et al. .................. 228/1.1 |
| 5,370,195 A | * | 12/1994 | Keshavan et al. .......... 175/420.2 |
| 6,220,376 B1 | * | 4/2001 | Lundell .......................... 175/430 |
| 6,616,725 B2 | * | 9/2003 | Cho et al. ......................... 75/231 |
| 6,840,424 B2 | * | 1/2005 | Sung .............................. 228/4.5 |
| 7,350,601 B2 | * | 4/2008 | Belnap et al. ................. 175/434 |

FOREIGN PATENT DOCUMENTS

| | | |
|---|---|---|
| DE | 20 2004010775 | 1/2005 |
| DE | 202004010775 U1 | 1/2005 |
| EP | 0032437 A1 | 7/1981 |
| EP | 0375707 A1 | 7/1990 |
| GB | 2287897 A | 10/1995 |
| WO | 8901384 | 2/1989 |
| WO | 0243915 | 6/2002 |
| WO | 0243915 A1 | 6/2002 |
| WO | 2006010551 A2 | 2/2006 |

OTHER PUBLICATIONS

Englsih machine translation of WO 0243915, Jun. 6, 2002.*

(Continued)

*Primary Examiner* — Kiley S. Stoner
*Assistant Examiner* — Carlos Gamino
(74) *Attorney, Agent, or Firm* — Ladas & Parry LLP

(57) ABSTRACT

A process for reducing aluminum pick-up and adherence during the ultrasonic welding of aluminum braids which are welded in a vertically and/or horizontally adjustable compression chamber of an ultrasonic welding device. The static tool parts which delimit the compression chamber have working surfaces made from polycrystalline diamond (PCD).

10 Claims, 3 Drawing Sheets

(56) References Cited

OTHER PUBLICATIONS

Figure 1:
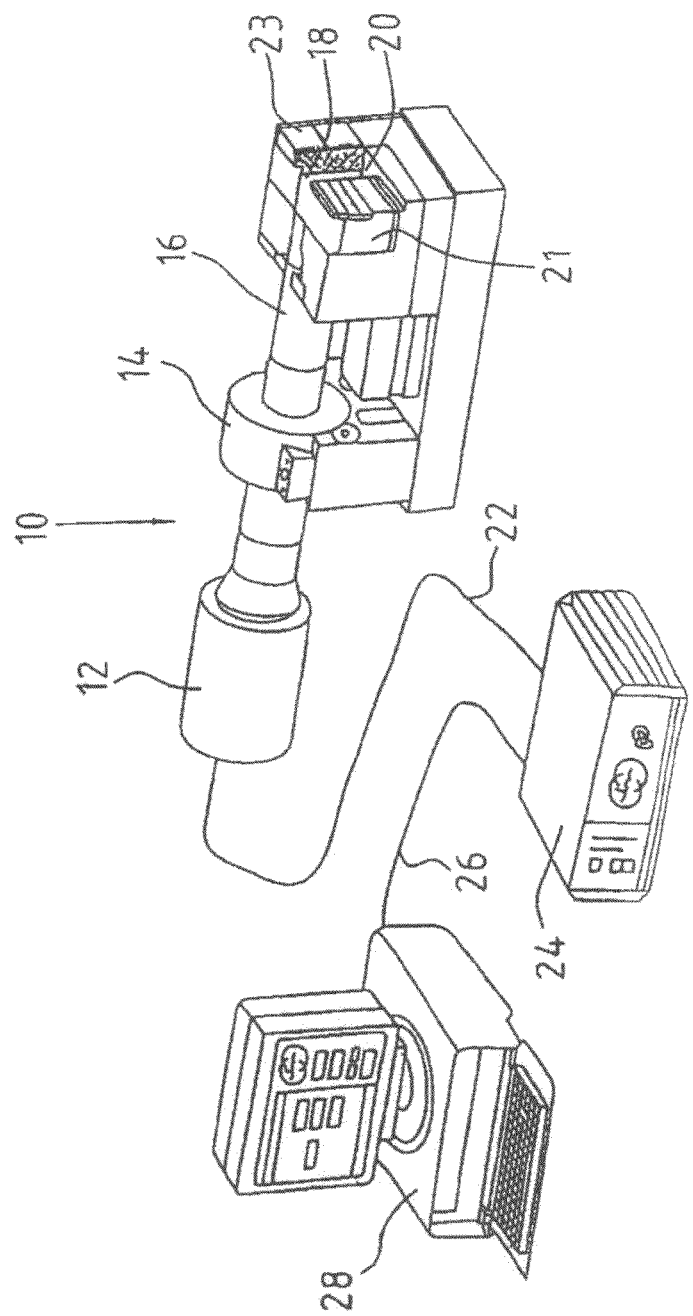

English Machine Translation of WO0243915, Jun. 6, 2002.*
European Office Action dated Feb. 1, 2013, corresponding to European Patent Application No. 2 210 317; with English Abstract.
Gutensohn, M., et al.: "Reduction of the Adherence of Aluminum on Ultrasonic Welding Tools." 2005. Welding and cutting, vol. DVS-Reports 2037, 2005 S. 452-456; which was cited in the European Office Action dated Feb. 1, 2013, corresponding to European Patent Application No. 2 210 317; with English Abstract.
Gutensohn, M., et al.: "Ultrasonic Welding of Aluminum Strands." 2007. Welding and Cutting: Journal for Welding and Related Methods, vol. 59, H. 10 Duesseldorf: DVS-Media GmbH, 2007, pp. 550-554; which was cited in the European Office Action dated Feb. 1, 2013, corresponding to European Patent Application No. 2 210 317; with English Abstract.
Publication LEONI in Team Issue 4, 2006; which was cited in the cited in the European Office Action dated Feb. 1, 2013 ,corresponding to European Patent Application No. 2 210 317; with English Abstract.
Wikipedia-Extract concerning cable fetched from "Internet Archive WaybackMachine" dated Nov. 15, 2003, which was cited in the Cited in the European Office Action dated Feb. 1, 2013, corresponding to European Patent Application No. 2 210 317; with English Abstract.

* cited by examiner

PROCESS FOR REDUCING ALUMINIUM PICK-UP, AND ULTRASONIC WELDING DEVICE

The invention concerns a process for the reduction of pick-up and/or adhesion of aluminum or aluminum alloy during ultrasonic welding of braids, which feature leads or single wire consisting of aluminum or aluminum alloy, to an end- or intermediate node to one another or to a carrier made of metal, whereby at least the braids are inserted into a vertically and/or width-wise adjustable compression chamber, which is delimited in facing first boundary surfaces by sections of a sonotrode and an anvil or a carrier that is disposed on the anvil and in remaining facing second boundary surfaces by statically acting tool parts. The invention also further refers to the utilization of a work surface, which consists of polycrystalline diamond or contains polycrystalline diamond, of a lateral border of a vertically and/or width-wise adjustable compression chamber of an ultrasonic welding device.

Furthermore the invention concerns an ultrasonic welding device encompassing a sonotrode, which transmits ultrasonic oscillations, with a sonotode head that features a welding surface, a counter electrode that is positioned opposite the welding surface as well as lateral delimiting elements, whereby the welding surface, the delimiting elements as well as the counter electrode, whether directly or indirectly, delimit a vertically and/or width-wise adjustable compression chamber.

In the case where braids, which consist of single wires or leads made from aluminum or aluminum material, are welded to one another or to a solid carrier, the disadvantage presents itself that the welding energy that is introduced causes the aluminum to flow or to transition into another so-called plastic phase so that a pick-up and/or adhesion to the lateral borders of the compression chamber that receives the braids follows.

In order to avoid this pick-up or adhesion it is already known to arrange intermediate foils between the tools of the compression chamber of the ultrasonic welding device and the braids that consist of aluminum, which prevent a direct contact with the welding tools. Measures in this regard are costly and fundamentally do not permit a fully automatic welding execution or welding processes at a fast rate.

In order to weld together aluminum wires with a u-shaped carrier, according to U.S. Pat. No. 3,717,842, the carrier is initially crimped around the aluminum wire in a known manner in order to then initiate the welding process. For this purpose there is an uncrimped section of the carrier between the sonotrode and the wires so that also no direct contact occurs between the tools and the aluminum wires.

The placement of the intermediate foil as well as the additional crimping also poses process-technical disadvantages that are particularly undesirable in the context of highly-automated welding operations.

The University of Kaiserslautern conducted studies of avoiding or reducing the adhesion of aluminum and aluminum alloys to sonotrodes during ultrasonic welding (AlF-Project No. 13.285 Nil). Therein the sonotrode head surface was coated by means of a magnetron sputtering process exclusively. The materials used were TiN and TiAlN. The layer thickness was several micrometers as a result of the coating process. It was possible to establish the result that the pick-up of aluminum during its welding was reduced, but only during the first welding procedures. Experiments have demonstrated that already after 100 welding procedures the undesired pick-up resumes. The cause of this is likely that due to the small thickness of the titanium-containing nitride layer, aluminum diffuses through the layer so that subsequently the pick-up can follow.

It is the purpose of the present invention to further develop a method of the type described previously so that braids that consist of aluminum or contain aluminum can be welded to one another or to a solid carrier without intermediate foils being required or that a solid part has to be crimped around the braids. Furthermore should the number of welding procedures correspond to those of common welding processes during the course of which aluminum materials are not welded together, without that pick-up or adhesion to the borders of the compression chamber occur in such a way that further welding procedures are negatively influenced.

The problem is solved according to the invention primarily in such a way that, for the purpose of static tool parts, those are used that feature polycrystalline diamond (PCD) on their work surface that faces the braid.

Surprisingly it has been demonstrated that in the case when the static tool parts, meaning the lateral border of a vertically and width-wise adjustable compression chamber of an ultrasonic welding device, are coated with polycrystalline diamond, a pick-up or adhesion of aluminum stops or is reduced in such a way that the welding processes are not negatively influenced; instead lifetimes of the tools are achieved that are commonly achieved in the case of welding braids that do not consist of aluminum.

Irrespective of the fact that in the area of the lateral border the largest relative movement between the wires and the delimiting border occurs, it is avoided that the aluminum, which begins to flow during the welding and transitions into a plastic phase, is picked up by the lateral border or adheres to them.

It is true that it is known to equip work surfaces of ultrasonic welding tools with a material of low expansion coefficients in order to achieve long lifetimes (EP-B-0 375 704, WO-A-02/43915). As materials for the wear-lowering layer ceramics such as silicon nitride ceramic, silicon carbide ceramic, zirconium oxide ceramic, aluminum oxide ceramic, dispersion ceramic such as aluminum oxide/titanium carbide, hard metal or polycrystalline diamond are listed. The wear-lowering material should thereby principally be applied to the strongly affected work surfaces of the sonotrode and the anvil, even though the notice is also provided that the lateral borders also can be coated with a corresponding material.

The polycrystalline diamond material is preferably disposed as an outer coating of a carrier made from hard metal, whereby the coating thickness of the polycrystalline diamond is to be selected such that the trans-diffusion of aluminum is precluded. Therefore the coating thickness should particularly amount to at least 0.1 mm, preferably between 0.2 mm and 0.7 mm, and especially between 0.4 mm and 0.5 mm. The thickness of the hard metal carrier upon which the PCD is applied or attached should be in the range between 0.8 mm and 2.0 mm, preferably between 1.0 mm and 1.2 mm.

The polycrystalline diamond is applied to a carrier that itself is connected with the static tool parts, namely side shifter or surface plate, which delimit the compression chamber into which the conductors that are to be welded are inserted.

Preferably the diamond layer should feature a thickness of at least 0.1 mm, particularly in the range of between 0.2 mm and 0.7 mm, and/or diamond kernels with an average diamond kernel size between 4 micrometers and 25 micrometers, whereby the volume of the diamond kernels is preferably between 90 volume % and 95 volume % of the layer.

Because pick-up or adhesion to the lateral borders of the compression chamber stops on account of the polycrystalline diamond, the energy input in regard to the welding of braids or of these to a solid carrier is to be assigned only to the material aluminum. In particular it is not required that a higher energy input or higher pressures for welding become necessary, which would have to be taken into consideration if pick-up or adhesion were to occur. At the same time the selection of the material aluminum results in the advantage of a weight reduction as well as the utilization of a lower cost material in comparison to copper.

The teaching according to the invention applies also in the case where a mixed compound is to be manufactured, namely aluminum and aluminum-containing braids are to be welded together with braids of other materials.

Admittedly the possibility basically exists to also coat the remaining delimiting surfaces of sonotrode and anvil with polycrystalline diamond. This would however result in a rise in cost of the tools without a noticeable advantage being demonstrable because the tendency for pick-up or adhesion arises primarily in the area of the static tool parts.

The invention concerns also the utilization of a work surface, which consists of polycrystalline diamond (PCD) or contains polycrystalline diamond, of a lateral border of a vertically and width-wise adjustable compression chamber of an ultrasonic welding device for the purpose of avoiding or reducing the pick-up or adhesion of aluminum or aluminum alloys during welding of braids, which are inserted into the compression chamber and consist primarily of leads or single wires made from aluminum or aluminum alloy. In this context it is provided that the braids, which consist of leads or single wires made from aluminum or aluminum alloy, are welded together with additional braids that consist of a material other than aluminum or aluminum alloy. Furthermore the braids can be welded together with a carrier made of metal that is disposed in the compression chamber or is utilized as a border of the compression chamber.

Furthermore the invention refers to an ultrasonic welding device for the execution of the previously mentioned method, encompassing a sonotrode for transmitting ultrasonic oscillations with a sonotrode head that features a welding surface, a counter electrode that is positioned opposite the welding surface as well as lateral delimiting elements, whereby the welding surface, the delimiting elements as well as the counter electrode, whether directly or indirectly, delimit a vertically and/or width-wise adjustable compression chamber, and which is characterized in that the welding surface of the sonotrode features the design of an equilateral open trapezoid with a bottom surface and lateral surfaces originating from side limbs, that the bottom surface and the respective lateral surface encompass an angle a of $100° \leq a \leq 145°$ and that the delimiting elements, in their surface that border the compression chamber, consist of polycrystalline diamond or contain it.

It is admittedly known to utilize sonotrodes with welding surfaces that feature the geometry of equilateral open trapezoid (DE-U-20 2004 010 775). The geometry is however utilized in order to avoid during the welding of braids with carriers of u-shaped geometry that lateral forces appear to an extent that the side limbs of the carriers are bent apart. At the same time a larger fill volume is to be made available for the conductors that are to be welded with the carrier. In contrast thereto a corresponding welding surface of a sonotrode is utilized according to the invention in order to supportively achieve, besides and in addition to the coating of the lateral delimiting surfaces of the compression chamber with PCD, that the pick-up of aluminum during the welding of aluminum-containing materials stops or is reduced in such a way that the welding is not negatively influenced.

In particular, it is intended that the surface of the element that delimits the compression chamber laterally features an outer surface consisting of a layer of polycrystalline diamond of a thickness d with $d \geq 0.1$ mm, in particular $0.2 \text{ mm} \leq d \leq 0.7 \text{ mm}$, said layer emanating from a carrier that is connected with the delimiting element in particular by means of hard soldering. The layer is disposed on the carrier.

By means of the special implementation of the work surface, meaning the welding surface of the sonotrode, the advantage is achieved that the total lateral forces that arise during the compression and welding of the braids are absorbed to a substantial extent by the lateral surfaces that delimit the welding surface of the sonotrode, so that in addition pick-up or adhesion of aluminum by the lateral delimiting surfaces of the compression chamber is prevented.

Thereby the preferred dimensions are to be indicated, that the sonotrode head features a width B and the side limbs protrude beyond the bottom surface at a height T of $0.1 \text{ B} \leq T \leq 0.3 \text{ B}$.

Further details, advantages, and characteristics of the invention can be gathered not only from the claims, from which the characteristics can be gathered—as such and/or in combination—but also from the following description of preferred embodiment examples that can be taken from the drawing.

Figure 2:
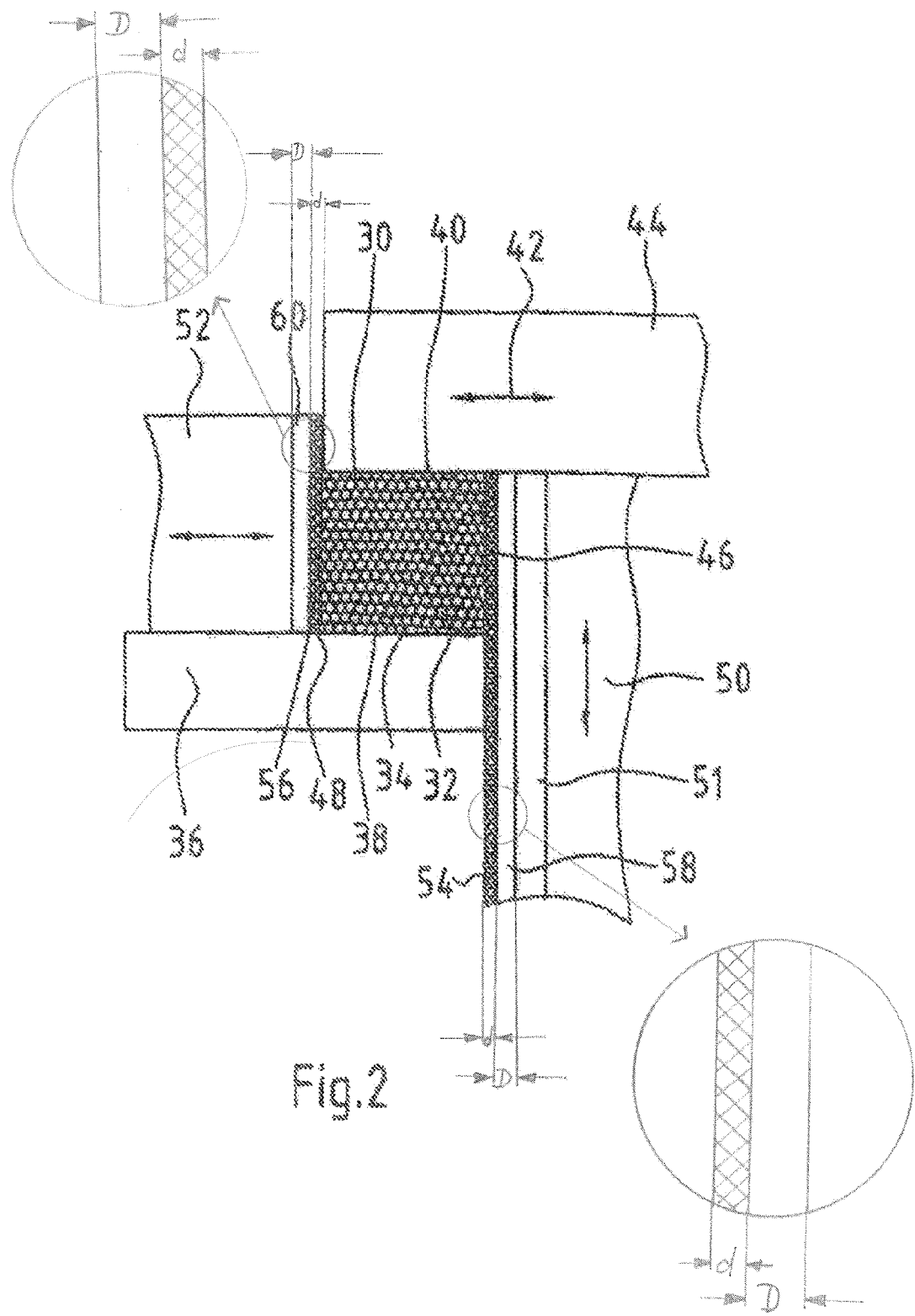

The drawings show:

FIG. 1 a schematic diagram of an ultrasonic welding installation,

FIG. 2 a schematic diagram of a compression chamber, and

Figure 3:
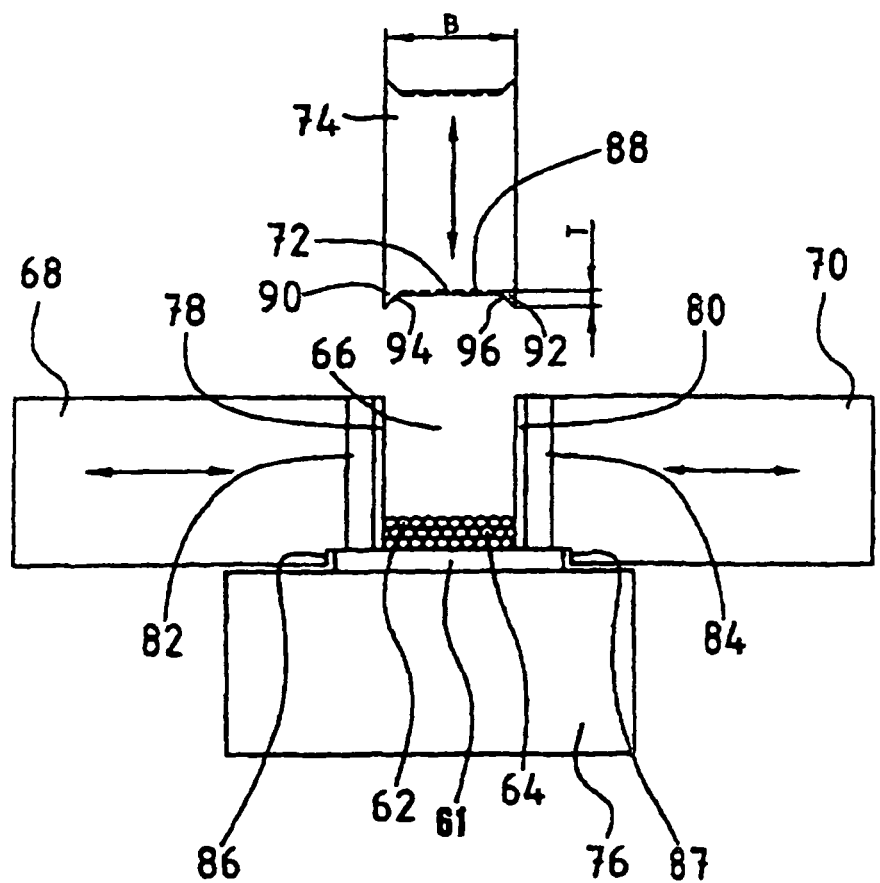

FIG. 3 a further embodiment of a compression chamber.

In FIG. 1 an ultrasonic welding installation is represented, purely in principle, in which braids consisting of aluminum or containing aluminum, meaning their fine wires or leads, are welded to an end- or intermediate node to one another or to a solid carrier such as a punching or bending part, for example a U-shape.

In a known manner the installation encompasses an ultrasonic welding device or machine 10 which features a converter 12, a booster 14, if applicable, as well as a sonotrode 16. With the sonotrode 16, meaning its head and thereby its welding surface, are associated a counter electrode 20—also referred to as anvil—as well as side shifters 21, 23, in order to encompass a compression chamber that in FIG. 2 is rendered in an enlarged representation, purely in principle.

If, according to FIG. 2, braids, consisting of aluminum or containing aluminum, that consist of individual thin wires or leads 32, 34, are welded in the compression chamber 30 by means of ultrasound, they are placed in the compression space 30, which is delimited by a work surface 38 of the sonotrode 36, a work surface 40 of the facing counter electrode (anvil 44), which can be slid along the double arrow 42, as well as work surfaces 46, 48 that emanate from a carrier 50—also referred to as column—which contains the anvil 44, or a surface plate 51 that is disposed thereon, as well as a side shifter 52. In this context practical experience demonstrates that pick-up of the braids, meaning their thin wires and leads 32, 34, by the work surfaces 46, 48 of the lateral borders of the compression chamber 30, i.e. the static tool parts that delimit the compression chamber 30, ensues. The cause of this is likely the fact that, in the range of the lateral borders, the largest relative movement between the braids and the tool parts occurs so that the aluminum, which starts to flow or transitions into a plastic phase, is picked-up by or adheres to the work surface so that proper welding procedures can no longer be executed.

Based on prior art, the braids are therefore enclosed by a foil in order to preclude a direct contract between the leads 32, 34 and the work surfaces 38, 40, 46, 48.

In contrast thereto is provided, according to the invention, that the work surfaces 46, 48 facing the braid are coated with polycrystalline diamond (PCD), whereby the PCD forms respectively a layer 54, 56 where the outer layer of a carrier 58, 60 consists particularly of hard metal, and where said carrier is preferably hard-soldered onto the actual tool part, meaning the side shifter 52 or the surface plate 51. The layer 54, 56 and the carrier 58, 60 form a unit which is then soldered onto the static tool parts 21, 23, 51, 52, 68, 70.

The layer 54, 56 should feature a thickness of at least 0.1 mm, preferably a thickness of between 0.2 mm and 0.7 mm. The volume portion of the diamond kernels should be between 90 volume % and 95 volume % and/or the kernel size of the diamond kernels should be in the range between 4 micrometers and 25 micrometers, whereby a preferred range of between 4 micrometers and 7 micrometers is to be stated.

Due to the fact that the wires or leads 32, 34, which consist of aluminum or contain aluminum, come in contact during welding in the area of the static tool parts exclusively with polycrystalline diamond, pick-up or adhesion of the aluminum, which flows or becomes plastic during welding, is surprisingly avoided, so that reproducible welding procedures of high quality are achievable, as it is known from welding of copper braids.

The teaching according to the invention is of course not limited to the welding of braids that consist of aluminum or contain aluminum to one another. Rather is the implementation of the work surfaces 46, 48 of the lateral borders according to the invention to be applied also then in the form of a PCD coating when compound mixtures are to be manufactured, such as when for example braids consisting of aluminum are welded to those made from, for example, copper, or a weld connection is to be established between a solid carrier made for example from copper or aluminum or an alloy of these with braids that consist particularly of aluminum.

The thickness (d) of the PCD layer 54 or 56 should be in the range between 0.2 mm and 0.7 mm, particularly in the range between 0.4 mm and 0.5 mm. In order to be able to perform a welding of the carrier 58, 60 with the shifter 52 or the column 50 without the appearance of warping, the thickness (D) of the carrier 58, 60 should be in the range between 0.8 mm and 2.0 mm, particularly about 1.2 mm to 1.0 mm. Thereby the connection between the carrier 58, 60 that features the layer 54, 56 and the surface plate 51 or the side shifter 52 is implemented particularly by means of hard soldering.

From FIG. 3, a schematic diagram of a section of an ultrasonic welding device can be observed, in the context of which a solid carrier 61, which can consist for example of copper, is welded to braids that consist of aluminum or an aluminum alloy. Represented are individual leads or wires 62, 64. The carrier 61 forms in the embodiment example the lower delimiting surface of a compression chamber 66 which is laterally bordered by shifters 68, 70 and a work- or welding surface 72 of a sonotrode 74 in a known manner. The carrier 61 is itself positioned on an anvil 76.

Corresponding to the teaching according to the invention the side shifters 68, 70 feature, on their delimiting surface that faces the compression chamber 66, a coating 78, 80 or a layer made of polycrystalline diamond (PCD) that emanates from a carrier 82, 84 which in turn is connected with the side shifter 68 or 70 in particular by means of hard soldering.

In order make the unambiguous positioning of the carrier 61 possible, the side shifters 68, 70 can feature, on the side facing the anvil, notches or cut-outs 86, 87, within which the longitudinal edges of the carrier 61 run.

From the illustrative representation it furthermore follows that the work surface 72 of the sonotrode 74 has the geometry of an open trapezoid. The short base arm thereby forms the bottom surface 88. The bottom surface 88 is delimited by side limbs 90, 92, whereby the interior surfaces 94, 96 of the limbs 90, 92 should delineate to the bottom surface 88 each an angle between 100° and 145°. Due to the geometry of the welding surface 72, i.e. that of an open trapezoid, the advantage results that the total lateral forces that arise during welding are absorbed by the limbs 90, 92 of the work surface 72, whereby in addition the tendency of pick-up or adhesion of aluminum to the lateral borders of the compression chamber 66 is reduced.

Furthermore the dimensioning of the side limbs 90, 92 should be adjusted relative to the sonotrode head in such a manner that the height T of the limbs 90, 92 mounts to $0.1 B \leq T \leq 0.3 B$ with B=width of the sonotrode head, which can be between 1.0 mm and 25.0 mm, without the teaching according to the invention being limited. T is the height above the bottom surface 88.

What is claimed is:

1. Process for the reduction of pick-up and/or adhesion of aluminum or aluminum alloy during ultrasonic welding of strands comprising leads or single wires of aluminum or aluminum alloy, to an end- or intermediate node, to one another, or to a carrier made of metal, wherein:

at least the aluminum or aluminum alloy strands are inserted into a vertically and/or width-wise adjustable compression chamber, which is delimited in facing first boundary surfaces by sections of a sonotrode and an anvil or a carrier that is disposed on the anvil, and in remaining facing second boundary surfaces by statically acting tool parts, wherein the static tool parts each comprise a work surface;

wherein among the first and second boundary surfaces polycrystalline diamond is present only on each work surface of the static tool parts.

2. Process according to claim 1, characterized in that, besides the strands comprising leads or single wires of aluminum or aluminum alloys, second strands made from another material are welded together.

3. Process according to claim 1, characterized in that the polycrystalline diamond is an upper layer of a metal carrier which is attached to the static tool part.

4. Process according to claim 3, characterized in that that the polycrystalline diamond forms a layer of a thickness (d) with (d)≥0.1 mm, on the metal carrier having a thickness (D) of 0.8 mm≤(D)≤2.0 mm.

5. Process according to claim 3, characterized in that the polycrystalline diamond forms a layer having a thickness that prevents the trans-diffusion of aluminum.

6. Process according to claim 4, characterized in that the layer made from polycrystalline diamond comprises diamond kernels between 90 volume % and 95 volume %.

7. Process according to claim 1, wherein the polycrystalline diamond is hard soldered to the static tool parts.

8. Process according to claim 4, wherein the thickness (d) is 0.2 mm≤(d)≤0.7 mm.

9. Process according to claim 1, characterized in that that the polycrystalline diamond forms a layer of a thickness (d) of 0.2 mm≤(d)≤0.7 mm.

10. Process according to claim 1, wherein the strands are inserted without an intermediate foil between the static tool parts and the strands.

* * * * *